May 12, 1970  E. EVALDS  3,512,077

TEMPERATURE CONTROL SYSTEM WITH ISOLATED CONTROL CIRCUIT

Filed July 26, 1967

INVENTOR.
EGILS EVALDS
BY William E. Gleaver
ATTORNEY.

United States Patent Office 3,512,077
Patented May 12, 1970

3,512,077
TEMPERATURE CONTROL SYSTEM WITH ISOLATED CONTROL CIRCUIT
Egils Evalds, Ardmore, Pa., assignor to Athena Controls Incorporated, a corporation of Pennsylvania
Filed July 26, 1967, Ser. No. 660,860
Int. Cl. G05f 1/44
U.S. Cl. 323—19                                            9 Claims

ABSTRACT OF THE DISCLOSURE

The present system provides a transformer coupling between the power section of the temperature regulating system and the temperature sensitive control circuit. The temperature sensitive control circuit employs an electronic switch to short circuit the secondary of the transformer and thus turn on a second electronic switch connected to the primary to fully energize the heater. This last-mentioned electronic switch is turned on a second time during a second half of an A.C. power cycle by saturating the transformer early in the second half of the cycle.

Figure 1:
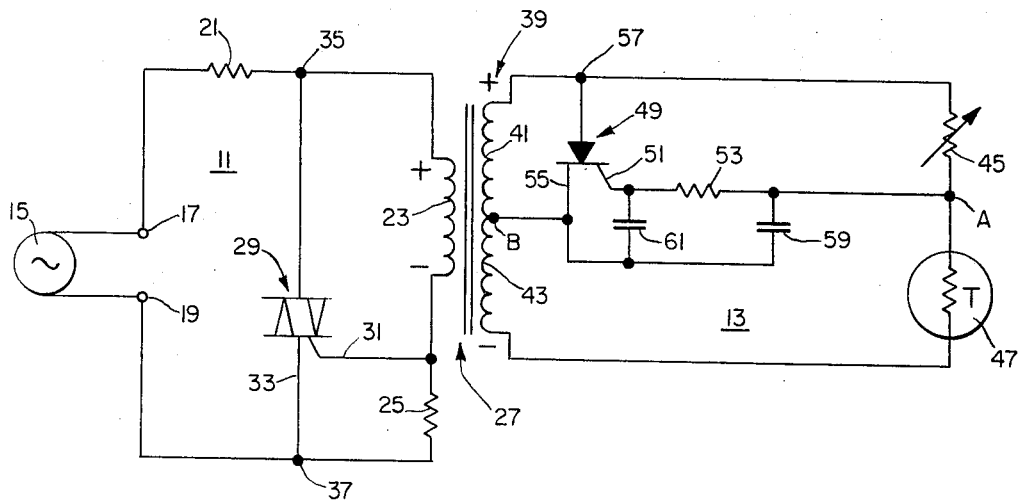

This invention relates to temperature control systems and more particularly to such systems in which the temperature sensitive circuit is electrically isolated from the power circuit.

BACKGROUND

In temperature regulating circuits there arises the problem that the circuit must handle relatively high valued currents in order to turn on a fan, start up a motor, spark a furnace, directly energize an electrical heater, or the like. These relatively high valued currents could be, and very often are, a possible danger to the user. The foregoing is true because in such a temperature regulating system the temperature sensitive circuit is usually adjusted by the user. If by chance the power circuit should become connected to, or short circuited with (through normal use of the system) the temperature sensitive circuit, the operator might well be subjected to the full impact of such a malfunction.

Accordingly there has been some attempt in the temperature regulating art to electrically isolate the power section of the system from the temperature sensitive section of the system. One such effort has been to employ fuses but the drawback is that the fuses very often burn out in response to transients in the system.

A second method has been to employ relays with the accompanying drawback that the relay points arc, become burned, dirty, etc. and need constant care to stay operative. In a third method, transformers have been employed with relatively elaborate electronics including flip-flops, etc. to enable the temperature sensitive control circuit to provide the primary power to effect a control element in the secondary. In such systems the power circuit is connected to the secondary. These latter methods have used relatively high power signals in the temperature sensitive control circuits and therefore are not the optimum in an isolation technique where low power in the temperature sensitive control circuit is the criterion.

SUMMARY

The present invention employs a transformer to effect an electrical isolation between the temperature sensitive circuit and the power circuit. The temperature sensitive circuit is in effect a bridge circuit wherein the secondary of the transformer by virtue of a center tap provides two legs of the bridge and in addition wherein there are two resistors one of which is a thermistor, providing the other two legs of the bridge. In the null circuit of the bridge there is connected an electronic switching means and hence when the null circuit connections experience a sufficiently great difference of potential therebetween, the electronic switching means is turned on to short out a portion of the secondary of the transformer. In accordance with transformer principles, the shorting out of the secondary effectively shorts out the primary and hence high valued current is passed through the primary. In response to the heavy currents in the primary, a second electronic switching means is turned on in the power circuit which enables the heater to employ heavy currents and hence produce large amounts of heat. The parameters of the circuits are chosen such that this last-mentioned shorting operation takes place relatively early in the first half of an A.C. cycle and hence the core of the transformer has not reached saturation. During the second half of the cycle, the transformer core is driven into saturation relatively early, but in the opposite sense from which it was driven during the first half of the cycle. Hence the primary winding is once again shorted which causes the second switching means to be energized and which in turn enables the heater device to conduct heavily during the second half of this cycle. In this manner, the temperature sensitive control circuit acts to control the power circuit while being completely isolated from the power circuit and while being composed of relatively simple electronic circuitry.

Figure 2:
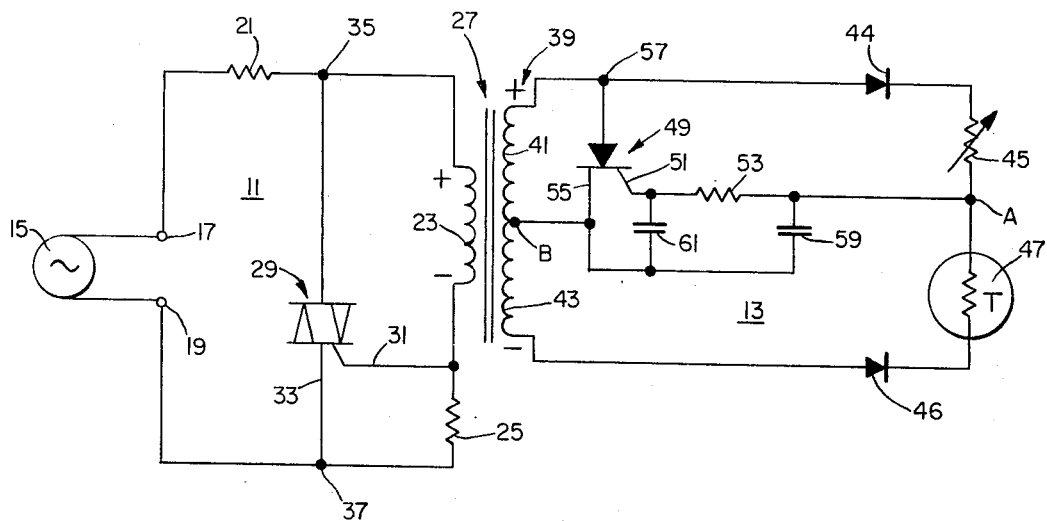

The advantages and objects of the present invention will be better understood by the description to follow, which description should be considered in conjunction with the accompanying drawing in which:

FIG. 1 is a schematic diagram of the overall system;
FIG. 2 is a schematic of the transformer and the temperature sensitive portion of a second embodiment.

In FIG. 1 there is shown a power circuit 11 and a temperature sensitive control circuit 13.

In the power circuit 11 there is shown an A.C. source of power 15 connected to two terminals 17 and 19. Connected to the terminal 17 there is a heater device 21. Now it should be understood that while in the drawing the heater device is shown as a resistor and therefore indicates an electrical form of heat, this heater device might well be a fan or some means to spark a furnace or like devices. The present description will be described in connection with an electrical heater but other forms of heat such as hot air, hot water, etc. are meant to be within the spirit of the present invention. Connected across one terminal of the heater 21 and the terminal 19 is a primary winding 23 series-connected to resistor 25. The winding 23 is the primary winding of the transformer 27 which is an iron core transformer whose magnetization characteristics follow the traditional symmetrical hysteresis loop.

Connected across the series connection of the primary winding 23 and the resistor 25 is a triac 29. A triac is a bidirectional silicon controlled rectifier having a control element 31 which is connected to the midpoint between the primary winding 23 and the resistor 25. Now it should be understood that the triac 29 will conduct current in either direction provided there is a difference of potential between the control element 31 and the base element 33 and there is a further difference of potential between the terminal 35 and 37. The direction of current conduction through the triac 29 will depend upon the nature of the difference of potential between the terminals 35 and 37.

In the temperature sensitive control circuit 13 there is a secondary winding 39 which is made up of two half windings 41 and 43. Each of the half windings 41 and 43 represents a different leg of a bridge circuit which is made up of the half windings 41 and 43, variable resistor 45 and thermistor 47.

The variable resistor 45 permits the user to set the temperature about which the circuit will control the operation. By adjusting the resistance value of the resistor 45 the difference of potential across the points A and B will be determined with respect to a change of resistance of the thermistor 47. It is well known that the resistance of a thermistor changes with the temperature, the resistance value thereof being high in a cold temperature ambient and being relatively low in a high temperature ambient. By being able to change the value of the resitsance 45, the ratio between the resistors 45 and 47 can be changed and hence the variation of the difference of potential between the points A and B can be accomplished to accommodate various operating temperatures. The differences in potential between points A and B is controlled dynamically in response to the resistance of the thermistor, but the operating point of the thermistor can be varied by adjusting the value of resistor 45.

Connected across the null points A and B is a silicon controlled rectifier 49 which has its control element 51 connected to the terminal A through resistor 53 and its base element 55 connected to the tap between the two half-windings 41 and 43. The anode of the silicon controlled rectifier is connected to the upper conductor of the bridge at terminal 57. Connected in conjunction with resistor 51 are two capacitors 59 and 61. The capacitors 59 and 61 in conjunction with the resistor 53 accomplish a phase shift which is necessary to enable the SCR circuit to conduct at a particular point of the A.C. cycle, the rationale of which will become apparent in the discussion hereinafter.

Let us consider the operation of the device shown in the drawing.

Consider first that an A.C. voltage is applied to terminals 17 and 19. Assume further that the thermistor 47 is cold and therefore its resistance is high. Further assume that the polarities which are shown are only applicable for one half of a cycle, which for the moment will be identified as the positive half of the cycle.

During the positive half cycle (shown in the drawing), there is a positive voltage across the primary winding 23, which induces a voltage across the combination half windings 41 and 43 as shown. If the thermistor 47 is cold, the system needs to turn on the heater 21 in order to generate heat. Under the conditions of a cold thermistor, and therefore a high resistance at the thermistor, the point A experiences a relatively high voltage. Accordingly, the difference of potential between the points A and B causes the silicon-controlled rectifier 49 to conduct.

When the silicon-controlled rectifier 49 conducts, the upper half winding 41 is shorted out. In accordance with the principle that $N_1I_1=N_2I_2$, we find that if $N_2I_2$ is equal to zero, then $N_1I_1$ must be equal to zero and hence the primary winding is short-circuited. With the primary winding 23 short-circuited there is heavy current conducted therethrough from the terminal 17, through the heater device 21, through the primary winding 23, through the resistance 25 to the terminal 19.

Now the resistance 25 is chosen to be relatively small so that it takes a great deal of current therethrough to develop a significant difference of potential thereacross. With the last-described heavy current being conducted through the resistance 25 there is relatively large difference of potential developed thereacross and hence there is sufficient difference of potential across the control element 31 and the base element 33 of the triac to cause the triac to conduct. In this particular half of the cycle, the triac will be conducting from the terminal 37 through the triac 29 to the terminal 35. Accordingly, the primary winding 23 becomes short-circuited because of the parallel circuit. In effect the triac by-passes the current. Hence, for the remaining portion of the positive cycle the heater is producing heat and attempting to warm the area in which the thermistor 47 is located.

Now during the negative half cycle, the triac 29 will be initially turned off because the polarities at the terminals 37 and 35 will be reversed. Also during the negative half cycle current will pass from the terminal 19 through the resistor R1, through the primary winding 23, through the heater 21 to the terminal 17. This current is initially somewhat reduced because of the impedance of the primary winding so that little or no heat is produced. However, at the time that the upper half winding 41 and the primary winding 23 were short-circuited, by the firing of SCR 49, the core of the transformer 27 was only partially saturated in a positive sense and now it is being subjected to magnetization (toward saturation) in a negative sense. Accordingly, the core of the transformer will be driven into negative saturation along a minor loop at some time early in the negative half of the cycle. When this happens the primary winding 23 is once again short-circuited and there are heavy currents therethrough (in the opposite direction from the positive half cycle) which provide a difference of potential across resistor 25 between the base element 33 and the control element 31 of the triac 29. In response thereto the triac 29 commences to conduct and this time current flows from the terminal 35 to the terminal 37. Again in response thereto, the heater 21 is once again subjected to heavy currents and produces heat. The heat during this negative (second) half-cycle is also used to warm the area in which the thermistor is located.

The foregoing operation continues until the thermistor 47 becomes sufficiently warm (which is indicative of the temperature of the area in which it is located) and its resistance value decreases. As the resistance of the thermistor 47 decreases, the point A becomes reduced in potential and hence the difference between points A and B is reduced eventually causing the silicon-controlled rectifier 49 to no longer conduct. This condition will remain until the thermistor 47 becomes reasonably cold such that the difference of potential between the points A and B, across the null circuit of the bridge, is sufficient to turn on the silicon-controlled rectifier 49 once again and short-circuit the upper half winding 41 which starts the whole operation over as just described.

Now it should be understood that the firing time of the silicon-controlled rectifier 49 is significant with respect to the cycle halves. In other words if the silicon-controlled rectifier 49 were to be turned on at the peak of the positive cycle, the core of the transformer 27 might be well along toward being saturated in the positive sense and hence would not effect the negative saturation that is necessary to cause the heater to be turned on during the negative half of the cycle. Accordingly, the circuit consisting of the resistor 53 and the capacitor 59 and 61 is connected across the control element 51 and the base element 55 of the silicon-controlled rectifier 49. The resistor 53 in combination with the capacitor 61 and 59 effect a phase shift which enables the silicon-controlled rectifier 49 to be fired at early point in the positive half cycle. The early cycle firing in turn enables the first short circuit operation to take place before the core of the transformer 27 has reached any degree of saturation in the positive sense. This partial saturation enables the system to saturate the core in the negative sense early in the negative half cycle, and hence short circuit the primary winding 23 because of the saturation principle rather than because of the shorted secondary winding principle.

FIG. 2 depicts the temperature sensitive control circuit 13 with two additional elements added, namely the diodes 44 and 46. The presence of diodes 44 and 46 provide pulsating D.C. current in the control circuit 13. Accordingly, the phase shift circuit does not fully discharge during the negative half of the cycle nor charge in the opposite direction. This arrangement enables the circuit to be more sensitive because a small voltage change at the thermistor 47 is readily reflected at the phase shift circuit which has not fully discharged. In response the SCR 49 can be fired as the result of this small change of thermistor voltage.

In view of the foregoing description, it becomes apparent that the heater is turned on for two portions of each A.C. cycle for as long as the ambient temperature of the thermistor is relatively cold. It is also apparent that the heater gets turned on early in the first half of the cycle by short circuiting the secondary of the transformer in response to firing the SCR in the temperature sensitive circuit. In addition, the heater gets turned on early in the negative half cycle by saturating the transformer in a negative sense which fires the triac.

The embodiments of the invention in which an exclusive property or privilege is claimed are defined as follows:

1. A temperature control system comprising in combination: transformer means having a first winding comprising the primary winding thereof and second and third windings which are series connected which together form the second winding of said transformer; bridge circuit means having first, second, third and fourth legs and two output signal terminals, said second and third windings comprising respectively said second and third legs, said first leg formed such that a voltage is developed thereacross which varies with the ambient temperature thereof; first electronic switching means having an input means, an output means, and a control means, said control means connected between said fourth leg and said first leg of said bridge and said input means and said output means connected across said second leg of said bridge such that when a predetermined voltage appears at said control means said first electronic switching means turned on to thus short circuit said secondary winding of said transformer; power circuitry means adapted to be connected to a source of heat to actuate the same; second electronic switching means connected to said power circuitry to pass or block energy being transmitted therealong; and said electronic switching means connected to said first winding whereby when said secondary winding is short circuited said second electronic switching means passes energy along said power circuitry means to energize said source of heat.

2. A temperature control system according to claim 1 wherein said first leg comprises a thermistor and said fourth leg comprises an adjustable resistor.

3. A temperature control system according to claim 1 wherein said first electronic switching means is a silicon controlled rectifier whose cathode is connected to one of said two output terminals and whose control element is connected to the other of said two output terminals and whose anode is connected to one side of said second leg.

4. A temperature control system according to claim 1 wherein said transformer includes a magnetizable iron core whereby when an A.C. signal is applied to said primary winding said transformers becomes magnetically saturated early in the signal half cycle following the time at which said second leg has become short-circuited thereby acting to turn on said second electronic switching circuit a second time.

5. A temperature control system according to claim 1 wherein said second electronic switching means is a triac whose control element is connected to said energy transfer means.

6. A temperature control system according to claim 1 wherein there is further included a phase shift means connected to said first electronic switching means and whose parameters are chosen to cause said first electronic switching means to conduct at a predetermined time.

7. A temperature control system according to claim 1 wherein there is further included first and second diodes connected to the input signal sides of said bridge circuit in order to transform any A.C. signal applied thereto into pulsating D.C. signal.

8. A temperature control system comprising in combination: an iron core transformer having a primary winding and a secondary winding with a tap thereon; an adjustable resistor; a thermistor series-connected to said adjustable resistor; first circuitry means connecting at a connecting point said series-connected thermistor and adjustable resistor to said secondary winding to form a bridge circuit; first electronic switching means connected between said tap and said connecting point of said series-connected thermistor and adjustable resistor and further connected to said first circuitry means such that when a predetermined potential is developed between said tap and said connecting point said first electronic switching means is turned on to short-circuit said secondary winding and consequently said primary winding; second electronic switching means including a bias element connected across said primary winding; power circuitry means adapted to be connected to a source of heat to activate the same and further adapted to be connected to a source of A.C. signals; and second circuitry means connecting said power circuitry means to said second electronic switching means such that when said primary winding is short-circuited in response to said secondary winding being short-circuited said second electronic switching means is turned on a first time to pass energy to said heater device and such that during the half-cycle following said last mentioned short circulating operation said transformer becomes magnetically saturated which results in turning on said second electronic switching means a second time thereby to transfer energy to said heater device a second time.

9. A temperature control system according to claim 8 wherein there is a phase shift circuit connected to said first electronic switching means to cause said last-mentioned means to be turned on at a predetermined time.

References Cited

UNITED STATES PATENTS

| 3,104,385 | 9/1963 | Evalds. | |
| 3,299,344 | 1/1967 | Werts | 219—494 |
| 3,375,347 | 3/1968 | Seney | 219—499 |

LEE T. HIX, Primary Examiner

G. GOLDBERG, Assistant Examiner

U.S. Cl. X.R.

219—494, 499, 505; 236—78; 323—24, 37, 75